United States Patent [19]

Rieschel

[11] 4,037,303
[45] July 26, 1977

[54] METHOD FOR THE BRIQUETTING OF METAL SWARF, PELLETS, AND POWDERS WITH ROLLER PRESSES

[75] Inventor: Hartmut Rieschel, Hattingen, Ruhr, Germany

[73] Assignee: Maschinenfabrik Koppern GmbH & Co., KG, Hattingen, Germany

[21] Appl. No.: 561,977

[22] Filed: Mar. 25, 1975

[51] Int. Cl.² ............................................. B22F 3/24
[52] U.S. Cl. ....................................... 29/420.5; 29/52; 164/70; 264/118; 425/308; 425/314; 225/103; 225/97
[58] Field of Search ............... 29/420.5, 420; 425/314, 425/308; 264/118; 225/103, 97; 164/70

[56] References Cited

U.S. PATENT DOCUMENTS

| 498,805 | 6/1893 | Martin et al. | 225/97 |
|---|---|---|---|
| 520,685 | 5/1894 | Kennedy | 225/103 |
| 3,058,891 | 10/1962 | Hoffmann et al. | 18/21 X |
| 3,075,243 | 1/1963 | Shipley et al. | 18/21 X |
| 3,300,815 | 1/1967 | Rohaus et al. | 18/21 |
| 3,390,968 | 7/1968 | Brown | 29/420 X |
| 3,429,362 | 2/1969 | Tachimoto | 164/70 |
| 3,541,974 | 11/1970 | Atkins | 18/21 X |
| 3,593,378 | 7/1971 | Metrailer | 18/21 |
| 3,677,683 | 7/1972 | Harris | 425/314 |
| 3,839,514 | 10/1974 | Nauta | 29/148.4 D |
| 3,897,183 | 7/1975 | Hofmann | 225/103 |

Primary Examiner—C.W. Lanham
Assistant Examiner—V. Rising
Attorney, Agent, or Firm—Salter & Michaelson

[57] ABSTRACT

Method and apparatus for the briquetting of metal swarf, pellets and powders on roller presses having briquetting rollers which are provided with moulding depressions on their cylindrical surfaces by which a briquette extrusion is formed having alternating briquette mouldings extending from one or other side of the extrusion and arranged in a chequerred pattern, each briquette moulding having a plane face on the opposite side of the extrusion. The extrusion is separated into individual briquettes by a surface pressure applied to the extrusion substantially at right angles to the plane of the extrusion.

8 Claims, 11 Drawing Figures

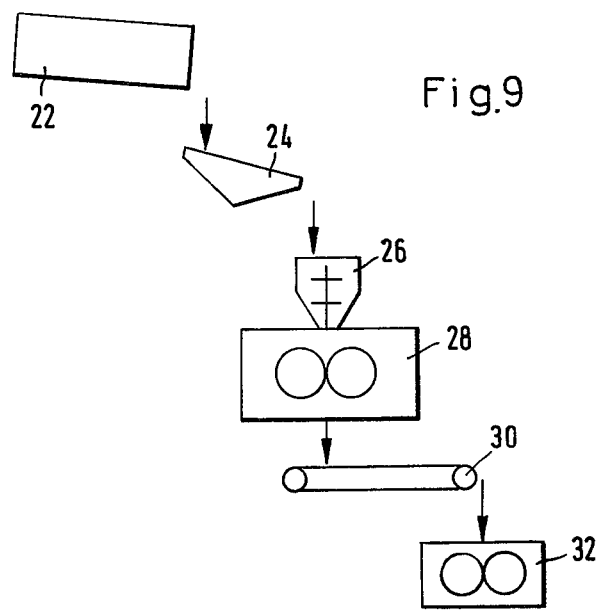
Fig.9
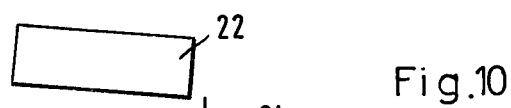
Fig.10
Fig.11
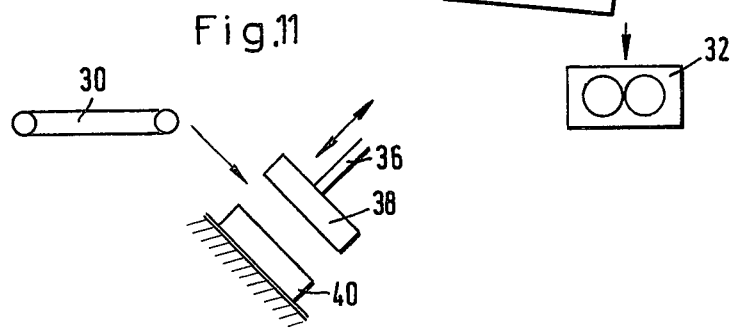

METHOD FOR THE BRIQUETTING OF METAL SWARF, PELLETS, AND POWDERS WITH ROLLER PRESSES

The invention concerns a method for the briquetting of metal swarf, pellets and powders with roller presses in which the rollers are provided with moulding depressions on their cylindrical surfaces. Metal swarf which is produced in large amounts in metal-removing processes in industry represents valuable scrap from the point of view of the material. Difficulties are caused by the low bulk density of the swarf both in its transport and also in feeding it into a melting furnace.

In order to remove this disadvantage it is known to compress swarf with roller briquetting presses to form briquettes of higher density thus making it more convenient for transport and for feeding into a furnace.

Because of the form of swarf it is impossible to manufacture individual briquettes on roller briquetting presses. The product is instead a briquette extrusion in which webs extend between the individual briquettes. In practice, such an extrusion will not be continuous. Instead, arbitrarily broken-up pieces of the extrusion are delivered by the briquetting roller press. With materials of high strength, such as for instance steel swarf, the separation of the pieces of the extrusion into individual briquettes causes extraordinary difficulties.

Similar difficulties occur in the manufacture of briquettes from metals occurring in the form of pellets, particularly iron pellets, or as powder. Powdered metals which are to be briquetted in large amounts include sponge iron and zinc powder.

It is an object of the invention to devise a method by means of which it is possible to divide a briquette extrusion containing moulded briquettes joined together by webs into individual briquettes and apparatus for carrying out the method.

This object is achieved according to the invention in that a briquette extrusion is formed having alternating briquette mouldings extending from one or other side of the extrusion and arranged in a chequerred pattern, each briquette moulding having a plane face on the opposite side of the extrusion and in that the extrusion is separated into individual briquettes by a surface pressure applied to the extrusion substantially at right angles to the plane of the extrusion.

In the solution according to the invention webs between individual briquettes are, in each case, sheared and the separation of the extrusion into individual briquettes is brought about in this way with high certainty. It is important that the separation of the briquette extrusion can be carried out between plane surfaces.

Thus, for instance, the briquette extrusion can be led through plain rollers as used in a sheet rolling press. The plain or sheet rollers should be driven at a circumferential velocity higher than that of the briquetting rollers. A circumferential velocity of the plain or sheet rollers substantially equal to twice that of the briquetting rollers has been found to be convenient. It is thereby ensured, due to the higher circumferential velocity, that during the breaking-up of the briquette extrusion it is not possible for any accumulation of material to form in front of the feed aperture of the plain or sheet rollers. In addition, the faster-moving plain or sheet rollers provide the advantage that pressure is applied abruptly to the briquettes, which simplifies the process of shearing of the webs between the briquettes. Division of the briquette extrusion may also take place between plane stamping plates which may be driven at a suitable stroke frequency.

The briquette extrusion is preferably briquetted with a gap of about 5 to 10 mm. breadth between the briquetting rollers. The depth of the moulding depressions should be greater than double the width of the gap between the briquetting rollers. Preferably, the briquetting rollers have moulding depressions therein of which the depth is two to three times that of the selected breadth of the gap between the briquetting rollers.

Metal swarf to be briquetted is preferably heated or ignited in a rotary furnace before briquetting. The heated or ignited swarf can be bed directly into the briquetting press from the rotary furnace. The swarf is thus briquetted in the hot state. The briquette extrusion leaving the briquetting press may, if necessary, be cooled before its separation.

With iron pellets there is usually a thin skin of oxide present which makes briquetting difficult. This can be broken down by the application of reducing gases, immediately before pressing, at least until a sufficient extent of metallic surface has been exposed.

A roller briquetting press for carrying out the foregoing method has in accordance with the invention briquetting rollers in which the rolling surfaces have moulding depressions therein spaced apart in a chequerred arrangement with cylindrical portions of the rolling surfaces therebetween, the briquetting rollers being arranged in the press with the moulding depressions on the surface of one roller opposite the cylindrical portions of the rolling surfaces of the other roller.

The contour of the moulding depressions on the roller surfaces is preferably chosen to be substantially quadrilateral so that the webs between the individual briquettes have substantially equal width over the perimeter of the briquette.

The method in accordance with the invention and several embodiments of the apparatus for carrying out the method are illustrated by way of example in the accompanying drawings and described in detail with reference to the drawings, in which.

Figure 2:
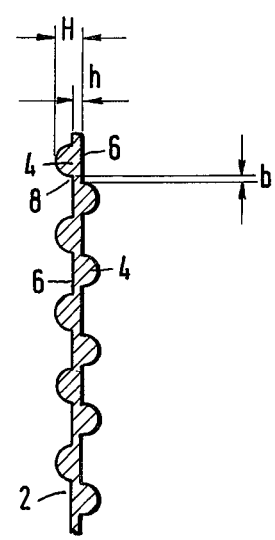
FIG. 2 shows a section along the line II—II in FIG. 1.
Figure 3:
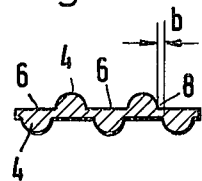
FIG. 3 a section along the line III—III in FIG. 1.
Figure 5:
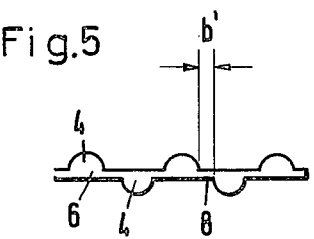
Figure 4:
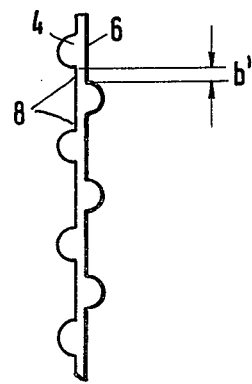
Figure 6:
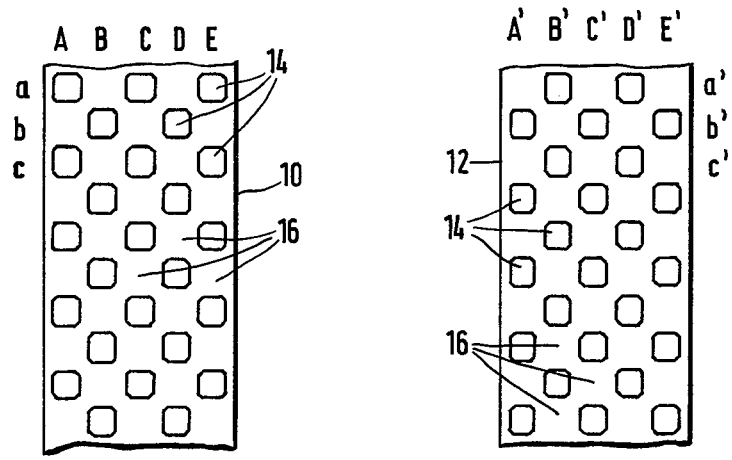
Figure 7:
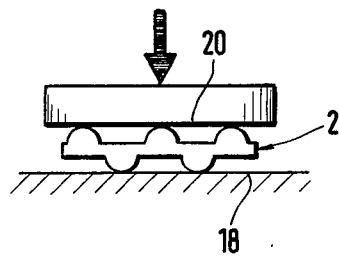
Figure 8:
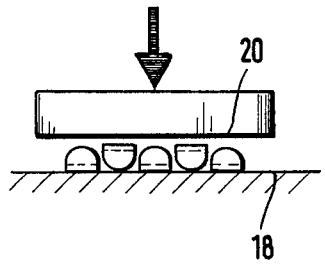

FIGS. 4 and 5 respectively show sections similar to the sections of FIGS. 2 and 3, but having a greater width of web between briquettes;

FIG. 6 shows developments of the surfaces of two rollers acting in conjunction in a roller briquetting press in accordance with the invention;

FIG. 7 shows schematically the separation of the briquettes from a briquette extrusion by means of pressure applied substantially at right angles to the plane of the extrusion;

FIG. 8 shows the separated briquettes after the pressure has been applied;

FIG. 9 shows schematically a plant for the briquetting of metal swarf according to the method of the invention;

FIG. 10 shows a variant of the plant according to FIG. 9, and

FIG. 11 shows a part of an additional variant of the plant.

Figure 1:
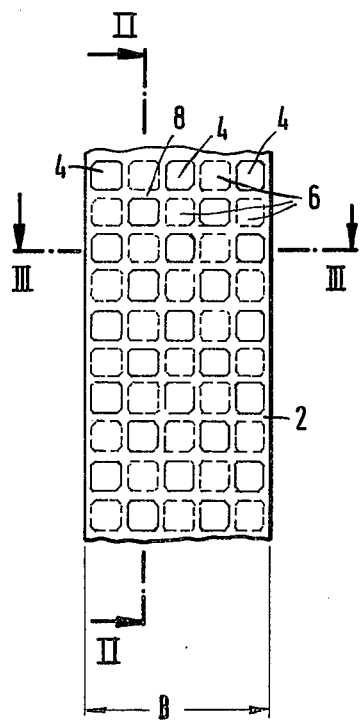
FIG. 1 shows a section of a briquette extrusion as produced by the method according to the invention.

The briquette extrusion 2 illustrated in FIG. 1 has a breadth B which is determined by the breadth of the rollers of a briquetting roller press used for its manufacture. The length of the briquette extrusion in a direction at right angles to its breadth is arbitrary and is determined by the unavoidable break-up of the extrusion during briquetting by the roller briquetting press.

The briquette extrusion illustrated has, for example, five moulded briquettes positioned side-by-side in a row and which appear alternately on the one and on the other side of the extrusion in both the longitudinal and transverse directions of the extrusion 2. In plan view, therefore, briquette moulds 4 appear arranged in a chequerred pattern projecting from the extrusion and having plane faces between them, beneath which, in each case, there project corresponding briquette moulds on the reverse side of the extrusion. The base of the briquette mould 4 is preferably quadrilateral, in particular square. In this way webs 8 are formed between individual briquettes. The webs 8 have a breadth $b$ which, in each case, is approximately constant over the whole perimeter of the individual briquette mould 4. To the viewer the briquette extrusion appears as a plate on which dome-shaped mounds are arranged in a cherrerred pattern. Functionally, however, the extrusion is made up of individual briquettes each having a plane base surface which overlap each other by a fraction $h$ of their height H. The plane of shearing between the individual briquettes 4 facing in opposite directions thus has a height $h$ and the corresponding cross-section of shear is equal to the height $h$ multiplied by the perimeter of the base line of the individual briquette 4. The dimensions $b$, $h$ and $H$ selected depend on the nature of the swarf to be briquetted in each case. FIGS. 4 and 5 illustrate sections similar to those of FIGS. 2 and 3 but with a web having a considerably larger breadth $b'$.

The height of the overlap $h$, which, as will be described below, is determined in the manufacture of the briquette extrusion by the minimum distance or gap between the rollers which has been set on the roller press. The minimum gap should be so chosen that the force applied in the separation of the briquettes, as described below, is sufficient to ensure shearing along the perimeter of the briquette mould. In practice, the overlap $h$ should be smaller than the height by which the individual briquettes project above the neighbouring plane faces of the extrusion and thus less than $\frac{1}{2}(H - h)$. In practice dimensions $h = 5$ to 10 mm. and $H - h = 15$ to 25 mm. are provided in each case, depending on the material to be briquetted. FIG. 6 illustrates developments of the roller surfaces 10, 12 of two rollers which act in conjunction in a roller briquetting press in accordance with the invention. Corresponding to the form of the briquette extrusion described above, there are provided on the roller surfaces, in each case, five rows A to E or A' to E' or moulding depressions 14 side-by-side and in an arrangement such that in adjacent rows a moulding depression 14 alternates with a cylindrical portion 16 of the roller surface throughout the roller surface. In this way the moulding depressions are countersunk into the roller surface so as to alternate with cylindrical portions of the roller surface in a chequerred pattern. As illustrated in FIG. 6, the cylindrical surfaces of the rollers are mutually staggered by one mould depression, in each direction, so that in operation a mould depression 14 on the surface of one roller is always opposite a plain cylindrical portion on the surface of the other roller.

In order to separate the briquettes from the briquette extrusion, pressure, preferably an intermittent pressure, is applied to the briquette extrusion perpendicular to its plane. The resulting effect is illustrated schematically in FIGS. 7 and 8. The briquette extrusion 2 lies between two plane surfaces 18 and 20, of which in this case the surface 20 forms part of a plate which can be moved in a perpendicular direction. By the application of pressure to the plate having the surface 20, the individual moulded briquettes are stamped out of the extrusion and, especially due to the downward movement of the moulds which project upwards relative to the briquettes supported by the lower surface 18. The webs connecting individual briquettes round the perimeter of the base of the briquette are thereby sheared. The shear distance is equal to H - $h$. This shear distance can be regulated by adjustment of the dimensions of the briquette extrusion, as given above, in such a way that a reliable separation can be achieved. The briquettes separated at the end of the travel of the plate having the surface 20 are illustrated in FIG. 8.

A plant for the manufacture of a briquette extrusion and for the separation of the briquettes is illustrated in FIG. 9. The swarf is introduced into a rotary drum furnace 22, in which the swarf is heated and, preferably, ignited. During this heating or ignition, the swarf is freed from residues arising from its working, for example, oil residues. The swarf is then continuously conveyed from the rotary drum furnace 22 by means of a conveyor device 24 to a feed worm 26, which is arranged above the roller feed aperture of a roller briquetting press 28, the rollers of which are provided on their cylindrical surfaces with mould depressions in the arrangement illustrated in FIG. 6. The metal swarf conveyed by the worm 26 has its gross volume reduced at the same time. The rollers of the roller briquetting press 28 are set at a predetermined minimum distance or gap which corresponds to the overlap height $h$ of the briquettes in the briquette extrusion. The briquette extrusion produced in the roller briquetting press 28 is transported by means of a conveyor device 30, for example a plate conveyor belt, to a roller press 32 provided with plain rollers, as used for rolling sheet. The rollers of this sheet roller press 32 are again set to a minimum distance or gap corresponding to the height of overlap H, in order to ensure that the individual briquettes are stamped out of the briquette extrusion, in the manner described above with reference to FIGS. 7 and 8, but the briquettes themselves are not additionally compressed. It cannot, of course, be excluded that in certain circumstances such a compression might even be desirable in order to strengthen the briquettes. In this case, such a compression would be achieved at the expense of a correspondingly high expenditure of driving power. In order to prevent build-up of the sections of the briquette extrusion with certainty the conveyor belt 30 should have a velocity greater than the circumferential velocity of the rollers of the roller briquetting press 28 and the rollers of the sheet roller press 32 also have a circumferential velocity greater than the velocity of the conveyor belt 30. In addition, the circumferential velocity of the rollers of the sheet roller press 32 should be chosen in such a way that an optimal stamping effect is produced during the passage of the extrusion through the press. It is therefore found to be convenient for the rollers of the sheet roller press 32 to turn with a circumferential velocity substantially twice as great as the circumferential velocity of the rollers of the roller briquetting press 28.

The plant illustrated in FIG. 10 substantially corresponds with that illustrated in FIG. 9. For this reason the same reference numerals are given to similar parts. As a variant, a cooler 34 is interposed between the roller briquetting press 28 and the sheet roller press 32, the briquette extrusion being passed through the cooler 34 before reaching the sheet roller press 32.

In FIG. 11 only the conveyor belt 30 of the plant of FIG. 9 is illustrated. The briquette extrusion is carried by this conveyor belt 30 to a fast-running press 36 having plane press plates 38 and 40, in which the briquette extrusion is broken down into individual briquettes in the manner described above with reference to FIGS. 7 and 8. Here, passage through this press is conveniently so arranged as to take place at an angle to the horizontal, so that the briquette extrusion and the briquettes after separation pass through the press under the effect of gravity.

Insofar as the method and the apparatus are described in the foregoing in connection with the briquetting of metal swarf, a similar method and apparatus may be used for the briquetting of metals in the form of pellets or powders.

I claim:
1. A method of briquetting metal swarf, pellets, powders and the like comprising the following steps:
 A. directing said metal materials to a roller press comprising opposed briquetting rollers having mold depressions located in the surfaces thereof with the mold depressions in said rollers being arranged in staggered relation so that they do not overlap when disposed in opposite relation;
 B. processing said metal materials between said rollers to form a metal extrusion comprising a generally flat web having a plurality of solid molded portions extending from opposite surfaces thereof, said molded portions all being of substantially the same size and shape and being arranged in closely adjacent, side-by-side relation to define aligned transverse and longitudinal rows extending across the web with each adjacent molded portion extending from opposite surfaces of the web, whereby each side of the web defines a checkered pattern;
 C. positioning said extrusion between opposed continuous surfaces that extend from side to side of the extrusion; and
 D. simultaneously applying pressure against opposite sides of the extrusion by said opposed surfaces, with said pressure being substantially normal to the plane of said extrusion so as to simultaneously engage the outermost surfaces only of the oppositely extending molded portions of at least one transverse row, thereby causing the extrusion to break along the web portions interconnecting adjacent molded portions so as to separate the latter to form individual briquettes.

2. The method of claim 1 further characterized in that the thickness of said web is less than one-half the combined thickness of the web and a molded portion.

3. The method of claim 1 further characterized in that said opposed surfaces comprise flat planar surfaces.

4. The method of claim 1 further characterized in that said opposed surfaces comprise oppositely disposed smooth-surfaced pressure rollers.

5. The method of claim 4 further comprising the step of driving the pressure rollers at a greater circumferential velocity than that of said briquetting rollers.

6. The method of claim 5 wherein the pressure rollers are driven at substantially twice the speed of said briquetting rollers.

7. The method of claim 1 comprising the further step of heating said metal materials prior to entry thereof between said briquetting rollers.

8. The method of claim 7 comprising the further step of cooling the extrusion prior to the separation thereof into individual briquettes.

* * * * *